United States Patent [19]

Ohyama et al.

[11] Patent Number: 4,767,927

[45] Date of Patent: Aug. 30, 1988

[54] APPARATUS FOR READING RADIATION IMAGE INFORMATION STORED IN IMAGING PLATE

[75] Inventors: Yoshirou Ohyama; Kazuhiro Iinuma, both of Tochigi, Japan

[73] Assignee: Kabushiki Kaisha Toshiba, Kawasaki, Japan

[21] Appl. No.: 765,243

[22] Filed: Aug. 13, 1985

[30] Foreign Application Priority Data

Aug. 16, 1984 [JP] Japan .................................. 59-171205
Aug. 22, 1984 [JP] Japan .................................. 59-173369
Aug. 22, 1984 [JP] Japan .................................. 59-173370

[51] Int. Cl.$^4$ ............................................. G03C 5/16
[52] U.S. Cl. ................................ 250/327.2; 250/484.1
[58] Field of Search ........................... 250/327.2, 484.1

[56] References Cited

U.S. PATENT DOCUMENTS

| | | | |
|---|---|---|---|
| 3,859,527 | 1/1975 | Luckey | 250/327 |
| 4,142,101 | 2/1979 | Yin | 250/483.1 |
| 4,310,886 | 1/1982 | Kato et al. | 250/327.2 |
| 4,346,406 | 8/1982 | Kato et al. | 358/110 |
| 4,375,652 | 3/1983 | White | 358/213 |
| 4,410,799 | 10/1983 | Okamoto | 250/327.2 |
| 4,527,060 | 7/1985 | Suzuki et al. | 250/484.1 |
| 4,571,630 | 2/1986 | Yamagawa et al. | 358/226 |

FOREIGN PATENT DOCUMENTS

| | | | |
|---|---|---|---|
| 0007105 | 1/1980 | European Pat. Off. | 250/327.2 |
| 0123942 | 11/1984 | European Pat. Off. | 250/327.2 |
| 0215575 | 12/1983 | Japan | 250/327.2 |

*Primary Examiner*—Janice A. Howell
*Assistant Examiner*—Richard Hanig
*Attorney, Agent, or Firm*—Finnegan, Henderson, Farabow, Garrett and Dunner

[57] ABSTRACT

Radiation images are stored in a storage medium such as a light-stimulable phosphor, so-called "imaging plate". The radiation images temporarily stored in the entire imaging plate are read out by irradiating the exciting light to each line of the imaging plate so as to emit the accelerated phosphorescence. The emitted accelerated phosphorescence is received by the line sensor.

25 Claims, 11 Drawing Sheets

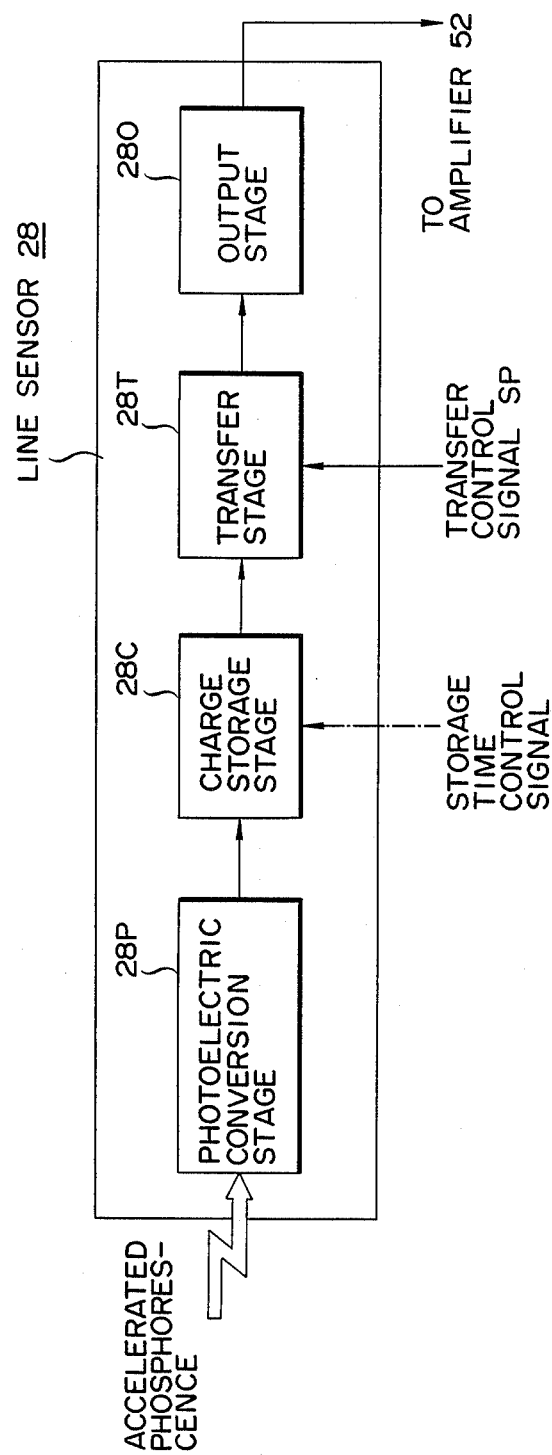
F I G. 4

APPARATUS FOR READING RADIATION IMAGE INFORMATION STORED IN IMAGING PLATE

BACKGROUND OF THE INVENTION

1. Field of the Invention

The present invention relates to an apparatus for reading radiation image information from a temporary storage medium by measuring intensities of accelerated phosphorescence while projecting exciting light onto the temporary storage medium. The temporary storage medium receives radiation, e.g., an X-ray that has been transmitted through an object under examination.

2. DESCRIPTION OF THE PRIOR ART

The accelerated phosphorescence is known as a luminescent phenomenon. That is, the temporary storage medium such as visual light-stimulable phosphor, infra-red-stimulable phosphor, or thermoluminescent material stores an incident pattern of energy radiation in its lattice defect during the radiation exposure, and after the radiation exposure, the storage medium illuminates the accelerated phosphorescence whose intensities are directly proportional to the energy stored therein while being exposed with the exciting light.

Such an accelerated phosphorescence storage medium is, for example, formed in a sheet. An X-ray is projected to the storage sheet so as to temporarily store in its lattice defect an image representative of an incident radiation intensity pattern. Thereafter, this storage sheet is scanned by the exciting light such as laser light to release the stored energy as intensity modulated light. The scanned light is detected by an appropriate detector so as to be converted into an electrical signal modulated in accordance with the intensity modulation of the incident light. The electrical signal is further processed to display the radiation image of the object on the TV monitor, or to record it on the photographic film. Such a typical example of use of the accelerated phosphorescence storage medium is known, for instance, from U.S. Pat. No. No. 3,859,527 to Luckey, issued on Jan. 7, 1975.

In the radiation image reading apparatus, it is desirable to realize a wider dynamic range and a faster reading rate.

It is therefore an object of the present invention to provide an apparatus for reading radiation image information by simultaneously scanning one line of a radiation image with the exciting light.

Another object of the present invention is to provide an apparatus for reading radiation image information by repeatedly scanning the same line of the radiation image with the exciting light, the intensity level of which is changed every scanning period.

SUMMARY OF THE INVENTION

These objects may be accomplished by providing an apparatus for reading radiation image information comprising:

an image recording member on which the radiation image is recorded, including a fluorescent substance, the recording area of which extending in a line direction and also a column direction perpendicular to the line direction;

a light source for successively irradiating one line of the entire recording area of the image recording member by line-shaped exciting light whose width corresponds to said one line of the image recording member, said line elongating along the line direction;

a drive device for intermittently translating the image recording member along the column direction in a one-line pitch;

a light collector for collecting accelerated phosphorescence emitted from the irradiated one line of the image recording member when irradiated by the line-shaped exciting light; and a line sensor for detecting the accelerated phosphorescence transferred from the irradiated one line of the image recording member through the collecting means to derive time-sequentially radiation image information based upon the recorded radiation image.

BRIEF DESCRIPTION OF THE DRAWINGS

For a better understanding of these and other objects of the present invention, reference is made to the following detailed description of the invention to be read in conjunction with the following drawings, in which:

FIG. 4 is a schematic diagram of an internal circuit of the line sensor;

DETAILED DESCRIPTION OF THE PREFERRED EMBODIMENTS

Arrangement of the First Reading Apparatus

Figure 1:
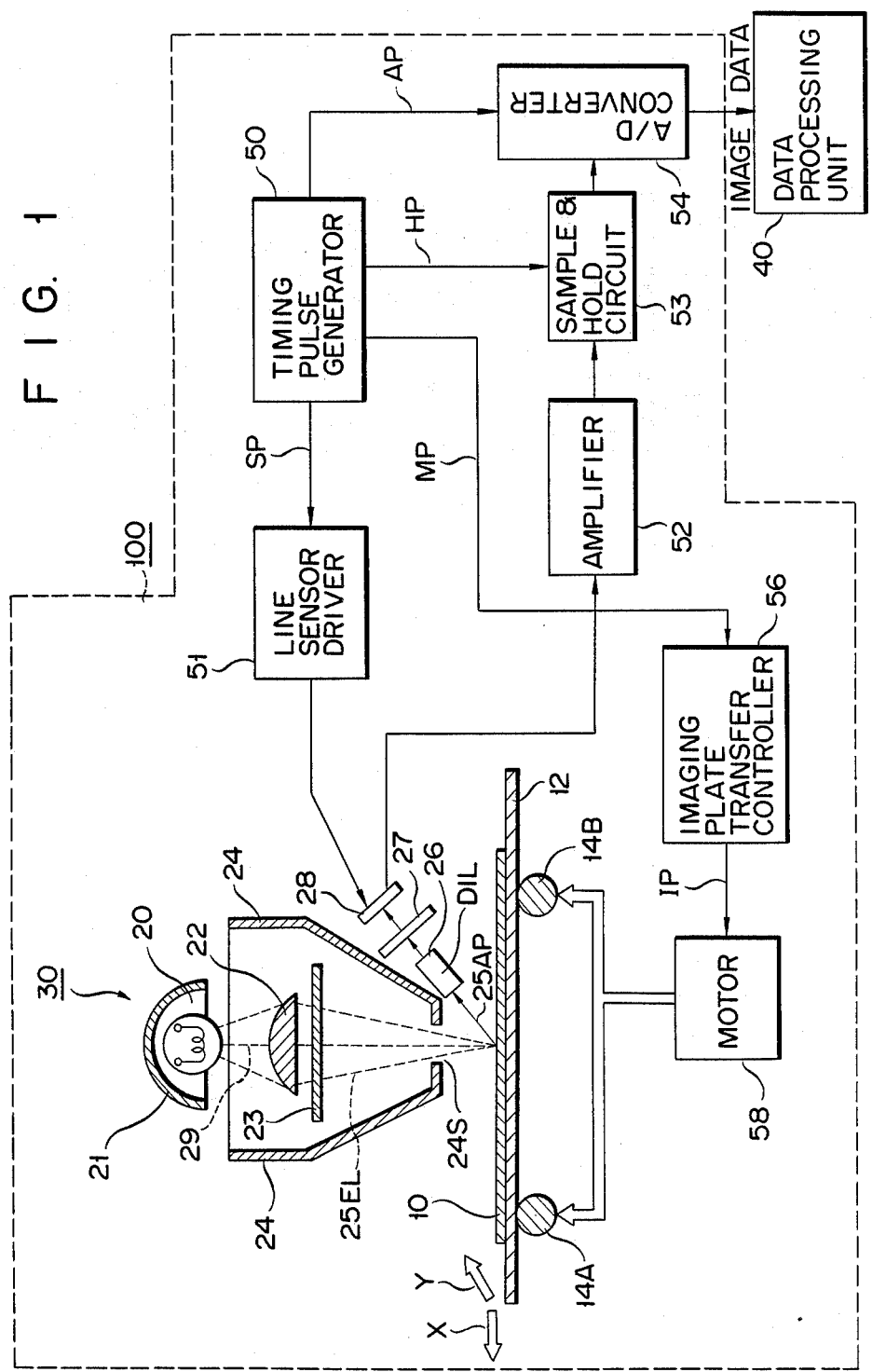
FIG. 1 is a schematic block diagram of a reading apparatus according to a first embodiment of the present invention.

Referring now to FIG. 1, a radiation image reading apparatus 100 will be described as a first preferred embodiment.

A plate-shaped temporary storage medium 10 is made from a fluorescent material, e.g., a visual light-stimulable phosphor, an infrared-stimulable phosphor, or a thermoluminescent material. In the present specification, such a temporary storage medium is referred to as "an imaging plate". As described hereinafter, this imaging plate 10 can temporarily store in its lattice defect incident radiation energy, and then release the stored energy as luminescence by receiving the exciting light. The imaging plate 10 is mounted on a conveyor belt 12 to be transported or scanned along a direction denoted by "X". The conveyor belt 12 is driven via rollers 14A and 14B by a motor 58. The imaging plate 10 has a given width in a direction Y perpendicular to the direction X, which will be referred to as "a line direction". The direction X, on the other hand, is referred to as "a column direction". Accordingly, this imaging plate 10 can be scanned not only in the line direction Y but also in the column direction X. In this case, one line of the imaging plate 10 is simultaneously scanned, or irradiated with the exciting light.

A light source 30 produces the line-shaped exciting light. A longitudinal axis of this exciting light extends along the line direction Y. The light source 30 is, for instance, constructed by a lamp for emitting white light. In the example, a line-shaped halogen lamp 20 is employed as the lamp because in general, its illumination fluctuations are reduced within ±5% of the rating value, thereby illuminating the imaging plate surface with substantially constant illuminance. Although not shown in FIG. 1, a power supply is connected to energize the halogen lamp 20.

An ellipse mirror 21 is positioned behind the lamp 20 along a light path 29, at a first focal point of the mirror 21. A cylindrical lens 22 is positioned at a second focal point of the mirror 21. Thus white light incident on the cylindrical lens 22 is shaped to be line-shaped light. A first bandpass filter 23 is positioned near the cylindrical lens 22 in the light path 29 so as to pass only exciting light having a given wavelength, as will be described later. A light shielding member 24 including at its tip portion a slit 24S is positioned to shield the space encompassing the cylindrical lens 22 and the bandpass filter 23. Thus the filtered exciting light 25EL can be illuminated toward the receiving surface of the imaging plate 10 (not shown in detail) through the slit 24S.

Figure 2:
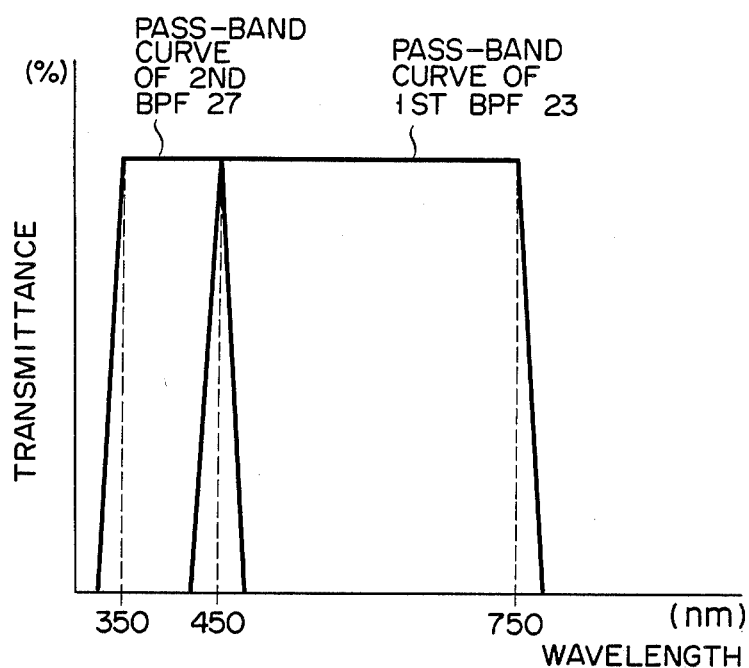
FIG. 2 is a graphic representation for bandpass filter characteristics.

In the example shown in FIG. 1, the pass-band range or transmission wavelengths of the bandpass filter 23 is designed to be 450 to 750 nm (nanometers), as illustrated by a characteristic curve in a graphical representation of FIG. 2. In the graph of FIG. 2, the abscissa indicates the wavelength and the ordinate represents the transmittance. Since the upper limit wavelength is selected to be 750 nm, the wavelength belonging to the infrared can be cut off. Moreover, as the lower limit wavelength is selected to be 450 nm, the wavelength belonging to the exciting light which is reflected from the imaging plate 10 can be cut off.

Figure 3:
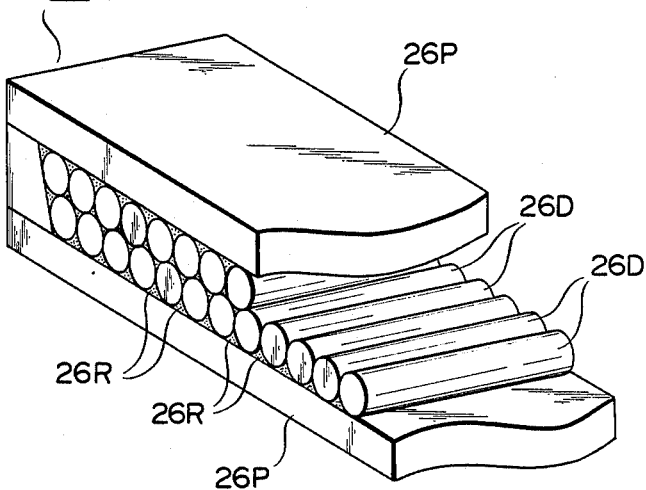
FIG. 3 schematically shows a distributed index lens assembly.

A distributed index lens assembly 26 is arranged in the light path 29, opposite to the cylindrical lens 22 with respect to the imaging plate 10. The distributed index lens assembly 26 functions as light collecting means, thereby collecting the accelerated phosphorescence, or light-modulated image emitted from the imaging plate 10 upon receiving the exciting light 25EL. This lens assembly 26 is constructed by a plurality of distributed index lenses 26D (so-called "rod lenses, or GRIN lenses"). These distributed index lenses 26D are aligned between a pair of side plates 26P and affixed to each other by the silicone resin 26R as shown in FIG. 3.

Referring back to FIG. 1, a second bandpass filter 27 is positioned behind the distributed index lens assembly 26 along the light path 29. The major function of this second bandpass filter 27 is to pass only the accelerated phosphorescence 25AP which has been collected by the distributed index lens assembly 26. In view of the spectrum of the accelerated phosphorescence 25AP, the pass-band of the second bandpass filter 27 is selected to be 350 to 450 nm (nanometers), which is narrower than that of the first bandpass filter 23 (see FIG. 2). In other words, any second bandpass filter may be employed if only the accelerated phosphorescence 25AP is sufficiently distinguishable from the exciting light 25EL.

At the terminal of the light path 29 a line sensor 28 is positioned to receive the filtered accelerated phosphorescence 25AP from the bandpass filter 27. The line sensor 28 outputs time-sequentially a signal indicating the radiation image information based upon the accelerated phosphorescence incident thereon.

A timing pulse generator 50 includes a crystal oscillator and produces various types of timing pulses SP, MP, HP and AP, as described hereinafter. These timing pulses have C-MOS voltage levels. A line sensor driver 51 is connected to the timing pulse generator 50 and the line sensor 28. Thus the line sensor 28 is electronically driven by the line sensor driver 51 under the control of the timing pulse SP.

An amplifier 52 is connected to the output of the line sensor 28 so as to amplify a signal indicating the accelerated phosphorescence. A sample and hold circuit 53 is connected to the amplifier 52. An A/D converter 54 is connected to the sample and hold circuit 53. The signal output from the amplifier 52 is sampled and held in the sample/hold circuit 53 under the control of the timing pulse HP. Then the analog output of the sample/hold circuit 53 is converted into corresponding digital data in the A/D converter 54 under the control of the timing pulse AP.

As a result, the digital data representing the radiation image information read out by the imaging plate 10 is transferred to a data processing unit 40. In the data processing unit 40, the conventional data process for the medical purposes is carried out.

An imaging plate transfer controller 56 is connected to the timing pulse generator 50 and also the motor 58. The transfer rollers 14A and 14B are rotated by the motor 58 which is controlled by the imaging plate transfer controller 56. The imaging plate transfer controller 56 receives the timing pulse MP from the timing pulse generator 50. The pulse period of this pulse MP is preset in accordance with the storage time of the line sensor 28 in the imaging plate transfer controller 56. Then, the transfer controller 56 produces a control signal IP for the motor 58 in response to the timing pulse MP. As a result, the imaging plate 10 can be interruptedly translated along the column direction X at a predetermined pitch under the control of the imaging plate transfer controller 56.

Internal Circuit of the Line Sensor

In FIG. 4, an internal circuit diagram of the line sensor 28 is shown. The line sensor 28 includes a photoelectric conversion stage 28P, a charge storage stage 28C, a transfer stage 28T and an output stage 28O. These stages are series-connected to each other. The photoelectric conversion stage 28P is made of, e.g., amorphous silicon. The conversion stage 28P receives the accelerated phosphorescence 25AP from the imaging plate 10 via the distributed index lens assembly 26 and the second bandpass filter 27. Then the photoelectric conversion stage 28P converts the accelerated phosphorescence 25AP into a line image photo-carrier. The line image photo-carrier contains the image information of each line of the imaging plate 10. The line image photo-carrier is temporarily stored in the charge storage stage 28C during the storage time period. These stored signal charges are sequentially read out from the storage stage 28C and thereafter sent to the output stage 28O by the transfer stage 28T in response to the transfer control signal SP.

The time required for the signal charge reading is referred to as "the storage time" in the specification. Since the imaging plate 10 is line-scanned, the charge reading is repeated at a given time interval. The transfer stage 28T is constructed by an analog register. The stored signal charges are written in this analog register 28T in a parallel form and they are read out in a series form. In the output stage 28O, thus the transferred signal charges are converted into voltage signals.

As previously described, since the line sensor 28 is made of amorphous silicon, the degree of freedom of design choice is extremely high in the sensor length and pixel size.

Internal Circuit of the Timing Pulse Generator

Figure 5:
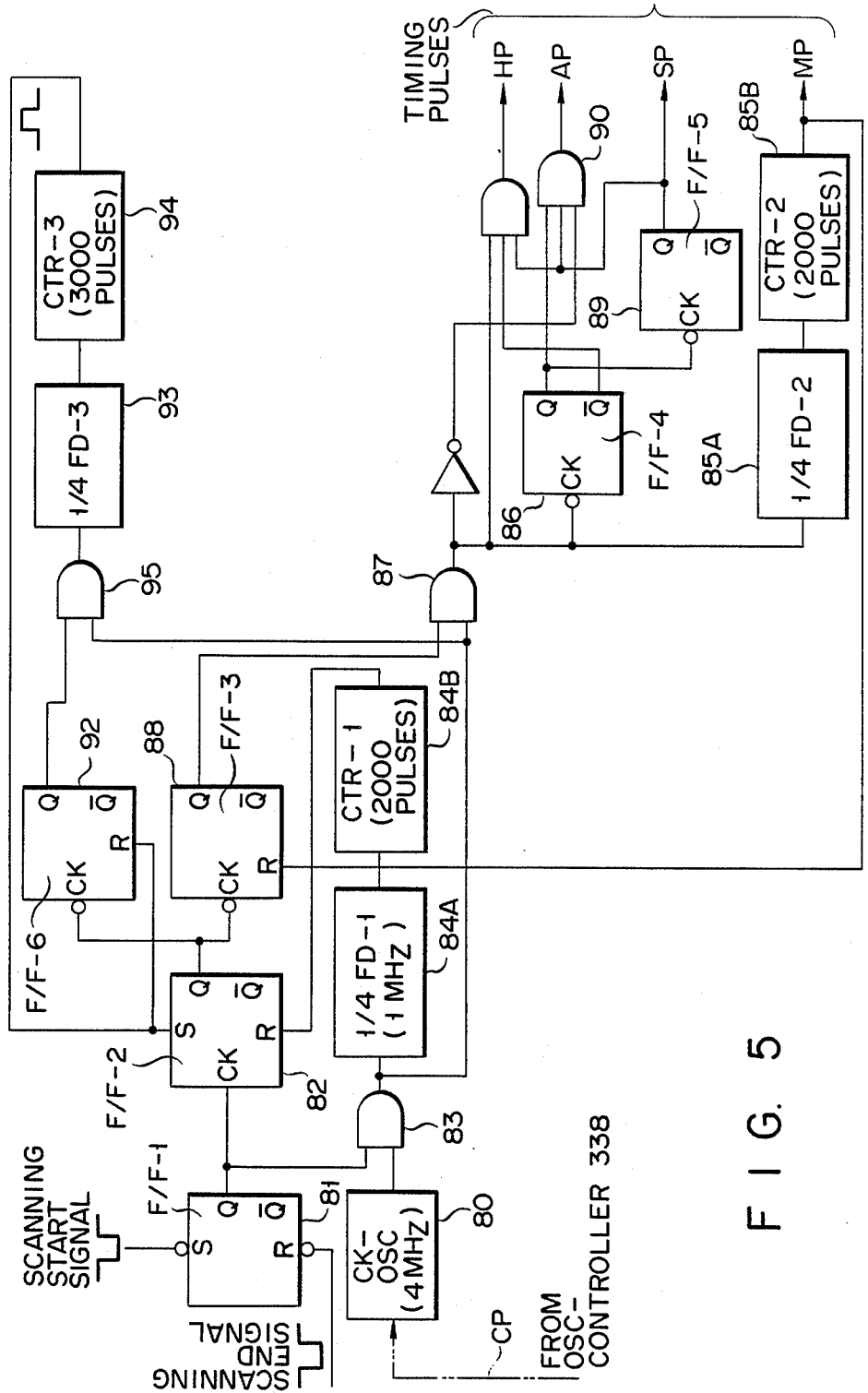
FIG. 5 is a circuit diagram of an internal circuit of the timing pulse generator.

In FIG. 5, an internal circuit of the timing pulse generator 50 is shown.

Figure 6:
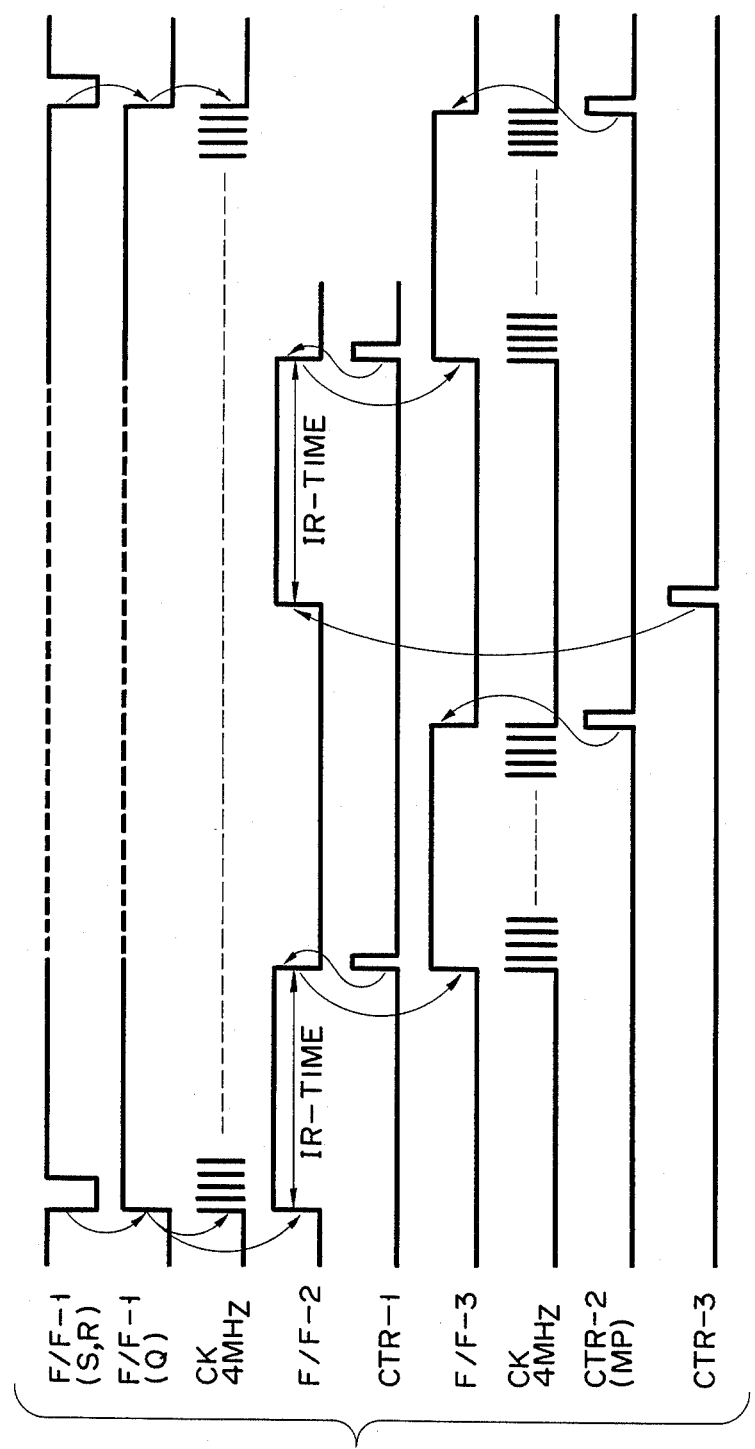
FIGS. 6 and 7 show timing charts of operations of the line sensor shown in FIG. 5.
Figure 7:
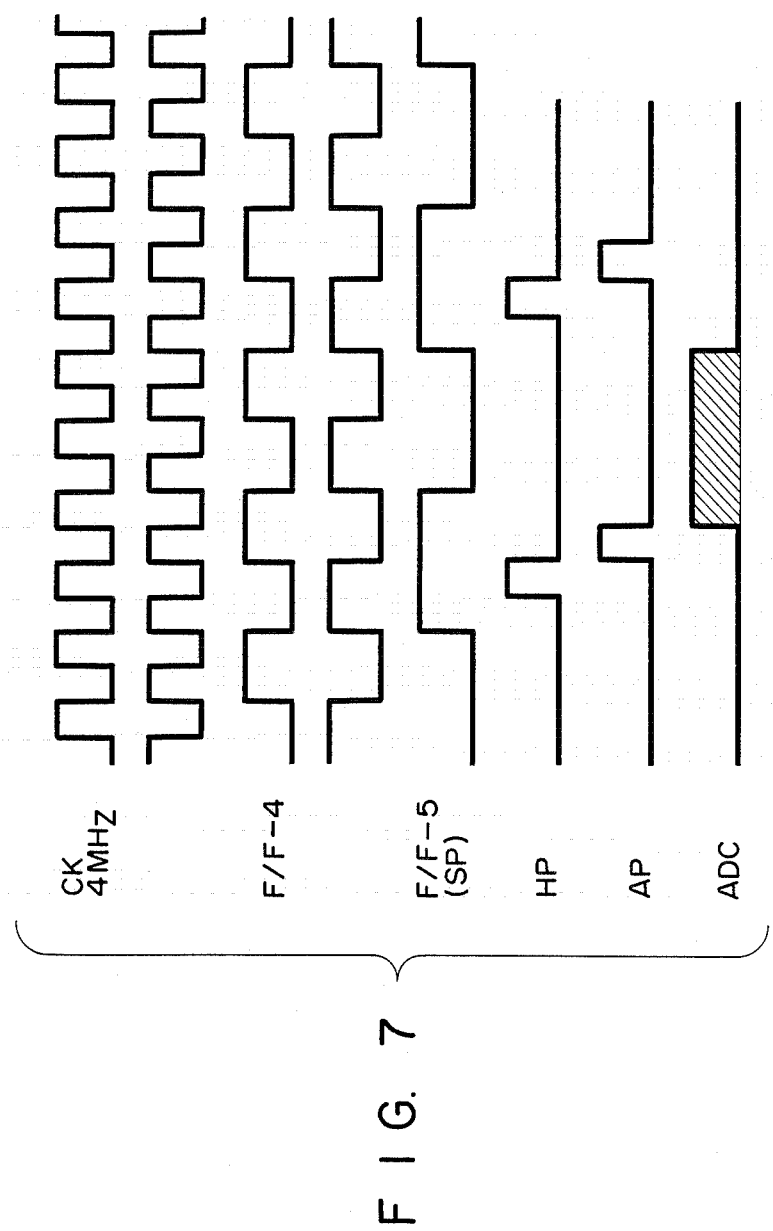

A description of operations of the pulse generator 50 will now be made with reference to timing charts of FIGS. 6 and 7.

When the imaging plate 10 (FIG. 1) is translated to the starting position of the image scanning, a scanning start signal is sent to a set terminal of a first flip-flop 81 from an imaging plate sensor (not shown in detail) provided adjacent to the conveyor belt 12. As a result, an output of the first flip-flop 81 becomes high (i.e., the positive-going edge), which is then supplied to a clock input of a second flip-flop 82 and also one input of a first AND gate 83. In the meantime, as a clock pulse oscillator 80 produces clock pulses CK in the frequency of 4 MHz and the other input of the first AND gate 83 receives these clock pulses CK, this gate 83 is opened. The output (i.e., the clock pulse of 4 MHz) of the first AND gate 83 is sent, on one hand, to a first ¼-frequency divider 84A and, on the other hand, to a second ¼-frequency divider 85A via a second AND gate 87. The first ¼-frequency divider 84A is followed by a first counter 84B for counting 2,000 clock pulses every one cycle. The output of the first counter 84B is supplied to a reset terminal of the second flip-flop 82. Since the clock frequency of 4 MHz is divided into 1 MHz in the first ¼-frequency divider 84A and the counting cycle of the first counter 84B is selected to be 2,000 pulses, the reading time period is equal to 2 ms (milliseconds) for 2,000 pixels (one line) of the line sensor 28 (1/1 MHz = 1 μs, 1 μs×2,000=2 ms). Accordingly, when the first counter 84B has counted 2,000 pulses, the second flip-flop 82 is reset, i.e., a completion of the image reading for one line.

A third flip-flop 88 is connected to the second flip-flop 82. A fifth flip-flop 89 follows the fourth flip-flop 86 and delivers from its output Q the timing pulse SP to the line sensor driver 51 (FIG. 1). These second to fifth flip-flops 82, 88, 86 and 89, and the AND gate 87 have a function of reading the one-line data of the imaging plate 10.

As previously described, the timing pulse SP is the signal for driving the line sensor 28 and is frequency-divided by the fourth and fifth flip-flops 86 and 89 to produce 1 MHz drive signal SP. Then, one line (2,000 pixels) of the imaging plate 10 is read out by the line sensor 28 within 2 ms. The timing pulse HP is to control the sample and hold circuit 53. As seen from the timing chart of FIG. 7, this timing pulse HP is produced during the positive pulse period of the timing pulse SP (i.e., the output of the fifth flip-flop 89), so that only a stable-leveled signal is sampled and held from the read-out signal. The timing pulse AP is derived from a third AND gate 90 coupled to the fifth flip-flop 89. By receiving this timing pulse AP, the A/D converter 54 converts the read-out signal that has been sampled/held. The second counter 85B counts 2,000 pulses every one cycle. Since the second ¼-frequency divider 85A is connected to the input of the second counter 85B, the timing pulse MP is produced from the second counter 85B every one cycle from the second counter 85B (see FIG. 6). This timing pulse MP is sent to the imaging plate transfer controller 56 and also to the reset terminal of the third flip-flop 88. As a result, the motor 58 is driven to translate the imaging plate 10 along the X direction by a one-line pitch, thereby positioning the succeeding line of the imaging plate 10 to the reading position. Simultaneously, since the third flip-flop 88 is reset by this timing pulse MP and then the second AND gate 87 is closed, none of the timing pulses HP, AP and SP is produced from the timing pulse generator 50. That is to say, while the imaging plate 10 is translated, no line sensor/signal processing operation is carried out.

A sixth flip-flop 92 is connected to the second flip-flop 82. A third ¼-frequency divider 93 and a third counter 94 are series-connected to each other and follow the sixth flip-flop 92 via a fourth AND gate 95. As previously stated, the imaging plate 10 is translated by the one-line pitch after the preceding line is scanned. This requires the drive time, i.e., 1 ms in the present embodiment. To gain such a drive time together with the reading time (2 ms), the third counter 94 counts 3,000 pulses every one cycle (see FIG. 6). After the transportation of the imaging plate 10 has been completed, the second flip-flop 82 is set by the count output of the third counter 94.

Operation of the First Reading Apparatus

The white light emitted from the halogen lamp 20 of the light source 30 is incident upon the cylindrical lens 22 so that the white light beam is linearly converged into the line-shaped light, or the exciting light 25EL. The linearly-converged white light is filtered in the first bandpass filter 23. In the first bandpass filter 23, both the wavelength of the infrared, i.e., more than 750 nm and the wavelength of the accelerated phosphorescence 25AP, i.e., 350 to 450 nm are eliminated from the linearly-converged white light. The elimination of the infrared can prevent the imaging plate 10 from the overheating, while the elimination of the accelerated phosphorescence can avoid the interference between the exciting light 25EL and the accelerated phosphorescence 25AP.

It should be understood that the imaging plate 10 has already been exposed or recorded by the radiation image of the object under examination (not shown in detail).

The exciting light 25EL (white light) is converged in a line having approximately 100 μm (micrometers) onto the storage surface of the imaging plate 10. The line-shaped exciting light 25EL is used for exciting the storage surface of the imaging plate 10 on which the radiation image information has been previously exposed or recorded. Every storage period, each one line of the storage surface is simultaneously excited by the line-shaped white light (exciting light) 25EL. This line extends in the Y (line) direction in the drawing. As previously described, since the imaging plate 10 is successively and interruptedly transported along the X (column) direction perpendicular to the Y (line) direction, such a line excitation is intermittently repeated along the Y direction.

By this light excitation, the accelerated phosphorescence 25AP is emitted from the storage surface of the imaging plate 10, intensities of which correspond to the amount of the exposed radiation for each line. The accelerated phosphorescence 25AP is collected by the distributed index lens assembly 26 and thereafter filtered in the second bandpass filter 27. The filtered accelerated phosphorescence 25AP is finally incident upon the photoelectric conversion stage 28P of the line sensor 28. As the pass-band of the second bandpass filter 27 is selected to be 350 to 450 nm, the undesirable light such as the infrared and the exciting light cannot reach the line sensor 28.

In the line sensor 28, the photoelectric conversion and charge transfer are carried out, as already explained.

A detailed description will now be made of operations of the line sensor 28 with reference to FIGS. 1 and 4.

From the photoelectric conversion stage 28P, photo-carriers are derived in responding to the amount of the accelerated phosphorescence 25AP for each line of the imaging plate 10, and are stored in the charge storage stage 28C.

While the photo-carriers are being stored in the charge storage stage 28C during each exciting period, no timing pulse MP is produced from the timing pulse generator 50, resulting in no intermittent transportation of the imaging plate 10.

These photo-carriers are successively read from the charge storage stage 28C and then transferred to the output stage 280 by the transfer stage 28T in synchronism with the timing pulse SP for the line sensor driver 51. The photo-carriers are converted by the output stage 280 into the line image (voltage) signal. The line image signal is amplified in the amplifier 52 and then sampled/held in the sample and hold circuit 53. The sampled/held line image signal is fed to the data processing unit 40 after being A/D-converted into the corresponding digital line image data in response to the timing pulses HP and AP respectively.

On the other hand, when the photo-carriers for the respective one-line image information are read out from the charge storage stage 28C, the timing pulse MP is produced from the timing pulse generator 50. Upon receipt of the timing pulse MP, the motor 58 is energized under the control of the imaging plate transfer controller 56. Thus the imaging plate 10 disposed on the conveyor belt 12 is translated along the X (column) direction by one pitch, i.e., one line. When the succeeding line of the imaging plate 10 is just under the light source 30, the exciting light 25EL is projected to the present line of the imaging plate 10. The same reading operation for the stored radiation image information is again performed under a predetermined time sequence.

In accordance with the above embodiment, one line of the imaging plate 10 can be simultaneously excited by the line-shaped exciting light 25EL so that the illumination time for the individual pixel of the imaging plate 10 becomes long. As a result, the readout rate for the radiation image information can be increased.

In one conventional reading apparatus, assuming that the illumination time is, for example, set to be 10 μs (microseconds) and each line of the imaging plate is constituted by 2,000 pixels, the total scanning time for each line amounts to 20 ms (milliseconds). In accordance with the inventive apparatus 100, if one line of the imaging plate 10 is scanned for 2 ms by the exciting light 25EL having 100 μm width, the total illumination time for each pixel is 200 times longer than that for the conventional apparatus (2 ms/10 μs). Moreover, the time required for reading the radiation image information is ten times shorter than that for the conventional apparatus (20 ms/2 ms).

While the first reading apparatus has been described, the fast reading operation for the radiation image information can be achieved by employing the line scanning method.

Arrangement of the Second Reading Apparatus

Figure 8:
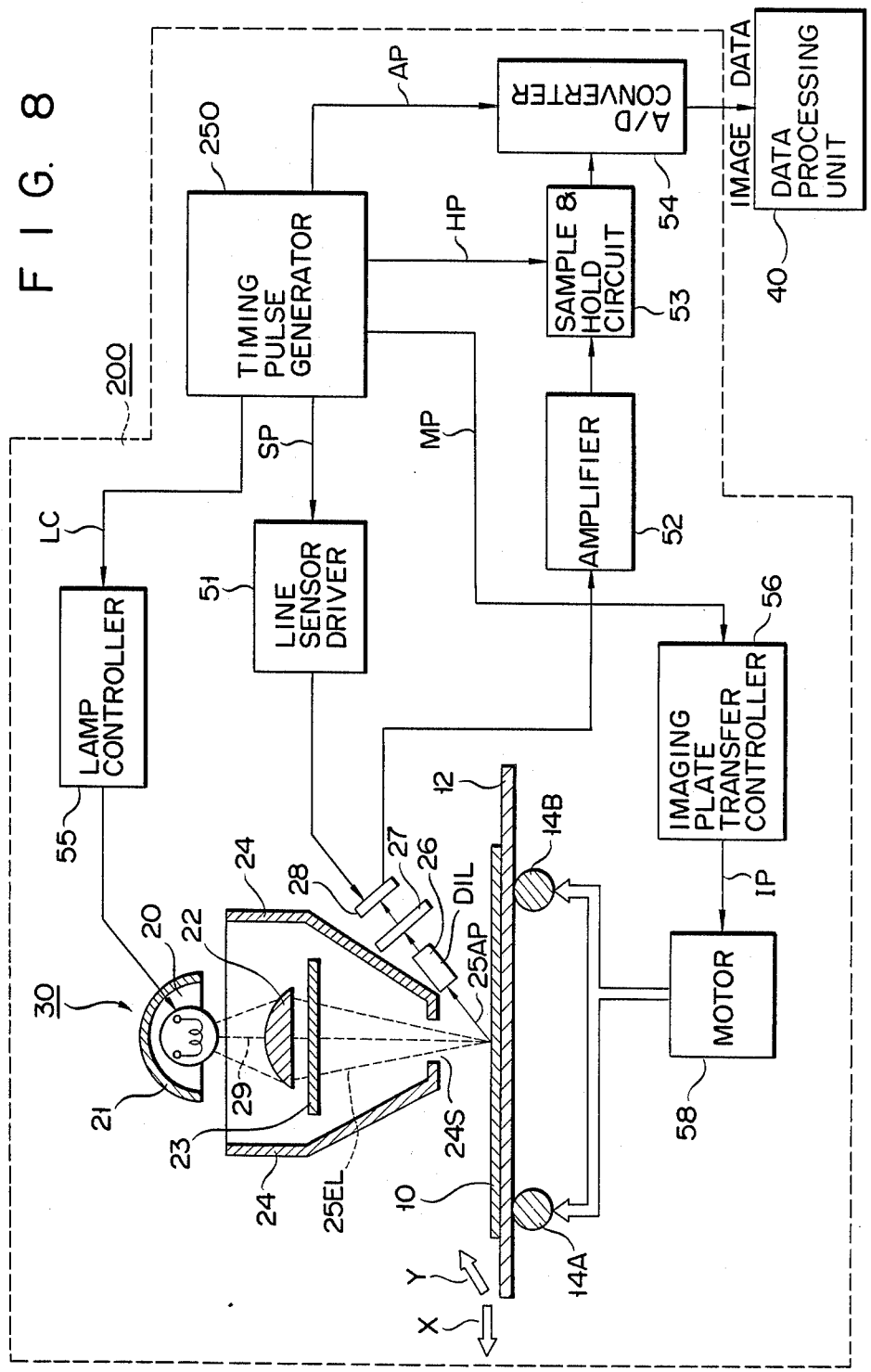
FIG. 8 is a schematic block diagram of a reading apparatus according to a second embodiment of the present invention.

In FIG. 8, a second reading apparatus 200 is shown. The same or similar circuit element of the second reading apparatus 200 is denoted by the same reference numeral as used in FIG. 1.

In general, the major circuit arrangement of the second reading apparatus 200 is the same as that of the first reading apparatus 100. The featured arrangements of the second reading apparatus 200 will now be explained.

A lamp controller 55 is interposed between a timing pulse generator 250 and the halogen lamp 20. The timing pulse generator 250, the major function of which is the same as the generator 50, newly produces a timing pulse LC. In response to the timing pulse LC the lamp controller 55 changes the supply voltage to the halogen lamp 20 in order to control the brightness of the halogen lamp 20.

According to this reading apparatus 200, the same line of the imaging plate 10 is repeatedly scanned by the exciting light 25EL, the brightness of which is changed every scanning time under the control of the lamp controller 55, as described in detail hereinafter.

It is, on the other hand, known that the dynamic range of the tight lock type line sensor 28 employed in the present embodiments is rather narrow. For instance, although the dynamic range of the line sensor 28 is generally approximately 1,000, that of the imaging plate 10 is more than 10,000. Accordingly, the dynamic range of the line sensor 28 must be widened as far as possible in order to achieve the proper diagnosis. If the storage time of the line sensor 28 is preset to be shorter, then the dark current can be necessarily reduced. However, as the light quantity given to the line sensor 28 is small, the line sensor 28 can hardly detect the signal information having smaller signal levels.

The second embodiment has been accomplished based upon the following recognition. When an imaging plate is evaluated, the following fact is recognized. That is, when the same line of the imaging plate which has been previously irradiated by the X-ray is scanned by the exciting light, for example, several times, the light quantities of the accelerated phosphorescence emitted from the imaging plate attenuate linearly and regularly over the entire projection time of the exciting light.

Figure 9:
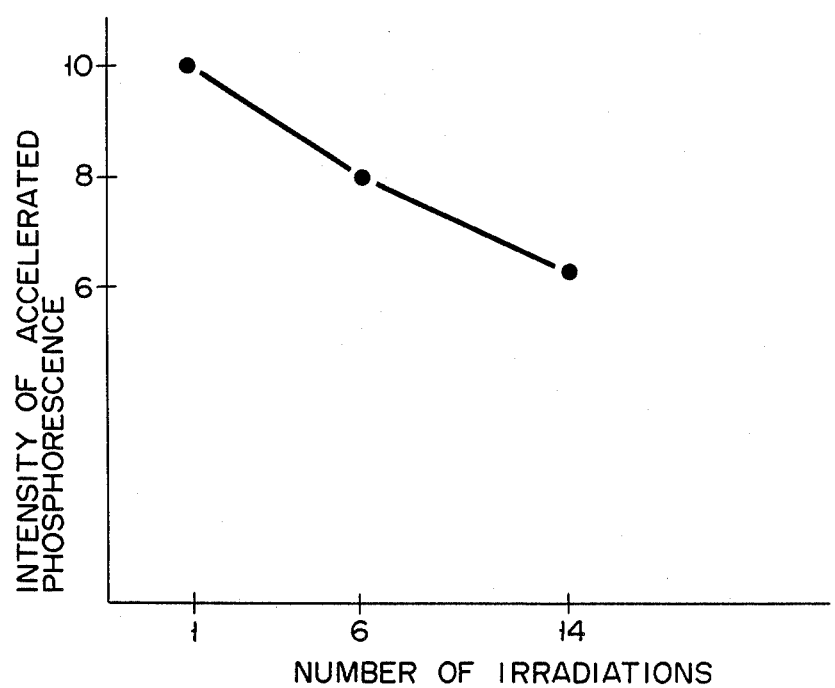
FIGS. 9 and 10 illustrate intensity characteristics of the imaging plate.

In FIG. 9, there is shown the relation between the intensities of the accelerated phosphorescence and the number of irradiation of the accelerated phosphorescence. This irradiation is performed within a unit time.

Figure 10:
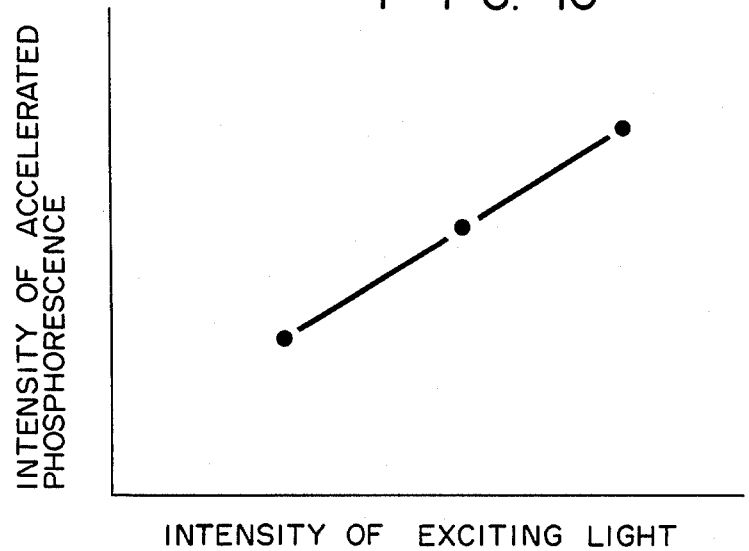

FIG. 10 shows the characteristic curve indicating the relation between the intensities of the accelerated phosphorescence and of the exciting light.

The graphical representations are denoted in the relative intensity scale. As seen from these graphical representations, the linear relationships exist in the intensities. That is, when the same line of an imaging plate is exposed several times by the exciting light whose intensities are changed, attenuation of the intensities of the succeeding exciting light with respect to the first exciting light can be calculated in percentage from the evaluation of the imaging plate.

Consequently, the same line, or area of the imaging plate is successively irradiated by the exciting light whose intensities are varied every irradiation. The measurements of the intensities of the accelerated phosphorescence are effected. The results of the accelerated phosphorescent intensities are corrected based on the intensities of the exciting light and the numbers of the irradiation, so that the practical dynamic range of the line sensor 28 can be widened.

According to the above evaluation of the imaging plate, the accelerated phosphorescence whose intensity level is lower than a normal minimal detectable level can be sensed by the line sensor 28 of the present invention. That is to say, after the output of the A/D converter 54, i.e., the first scanned image signal has been transferred to the external data processing unit 40, the timing signal LC is sent from the timing pulse generator 250 to the lamp controller 55 so that the same line of the imaging plate 10 is again irradiated by the halogen lamp 20 whose intensity is ten times greater than the first irradiation intensity. Since there is the linear relationship between the lamp intensity and the supply voltage, the intensity of the halogen lamp 20 can be changed by adjusting the variable resistor 62. The variable resistor 62 is connected in parallel with the power supply 60 and the halogen lamp 20. A slider 64 of the variable resistor 62 is mechanically connected to a pulse motor 66. The pulse motor 66 receives a control signal from the lamp controller 55 (see FIG. 11).

It should be understood that although the intensities of the second and succeeding accelerated phosphorescence emitted from the imaging plate 10 are attenuated to a given value because the imaging plate 10 has been already excited by the exciting light in the first scanning period, the amount of the intensity attenuation can be calculated from the data on the characteristic curve shown in FIG. 9. For instance, if the data processing unit 40 employs a memory table for storing the data on the relation between the numbers of the exciting operation and the amount of the intensity attenuation, such a data correction can be easily executed.

The succeeding output signals of the line sensor 28 are successively processed in the amplifier 52, sample and hold circuit 53, A/D converter 54 and the external data processing unit 40.

In general, the filament temperature of the halogen lamp 20 must be changed within 2,300° to 2,800° C. due to its inherent characteristic. In other words, there is a limit value in the range of the supply voltage to the halogen lamp. If the supply voltage exceeds this limit value, then the halogen lamp 20 is broken down. According to the above example shown in FIG. 11, since the variable range of the resistor 62 is selected within a predetermined value, no problem occurs in the halogen lamp 20 and the desirable change of the lamp intensity can be obtained.

Moreover, within the above variable range, variation of the wavelength of the halogen lamp can be maintained in the allowable values, although the filament temperature of the halogen lamp 20 is necessarily changed.

Figure 11:
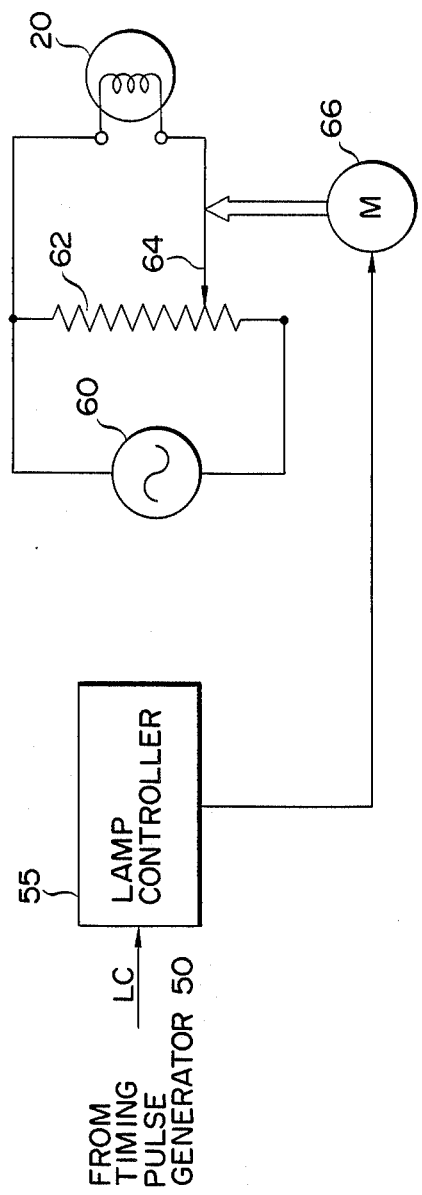
FIG. 11 is a schematic circuit diagram of the lamp controller.

As a result, because the pass-band of the second bandpass filter 27 is selected to be 450 to 750 nm and the variation of the exciting light wavelength of the halogen lamp 20 is kept within 350 to 450 nm by the first bandpass filter 23, the lamp controller 55 and the relevant controller 66, 62 shown in FIG. 11 are realized.

Referring back to the reading apparatus 200 of FIG. 8, such scanning operations are repeated, for example, three times and if the intensity of the halogen lamp 20 is ten times larger than that in the previous lamp scanning, the practical dynamic range of the line sensor 28 is 100 times wider than that of the line sensor shown in FIG. 1.

When the intensity of the exciting light 25EL exceeds a maximum value so that the amount of the accelerated phosphorescence exceeds the saturation exposure of the line sensor 28, the line sensor 28 outputs a constant saturation voltage. Accordingly, the signal fidelity of the line sensor 28 is lowered. To the contrary, as the intensities of the halogen lamp 20 are gradually increased according to the second embodiment, the line sensor 28 can detect all the image information having the lower signal level to the higher signal level without any saturation.

After the predetermined numbers of the excitation have been accomplished, the rollers 14A and 14B are rotated in response to the control signal IP fed from the timing pulse generator 250 via the imaging plate transfer controller 56. The imaging plate 10 is translated by the conveyor belt 12 by a necessary distance in the column direction X. Then the succeeding line of the imaging plate 10 is positioned at the exposure position by the exciting light.

According to the above embodiment, plural sets of image data on the same line of the imaging plate 10 are processed in the data processing unit 40 so as to acquire one set of the radiation image data on the same line. Such a data processing technique is known in the art. For instance, when the intensities of the exciting light are increased every excitations, only the intensity of the first excitation that is lower than a first threshold value is negligible and the intensity of the second excitation that is higher than a second threshold value is acquired.

While it has been described in detail, the second embodiment is characterized in that the same line of the imaging plate 10 is repeatedly irradiated by the line-shaped exciting light 25EL whose intensities are increased every irradiation, and thereafter the resultant intensities of the accelerated phosphorescence 25AP are corrected based on the attenuation coefficient between the intensities of the accelerated phosphorescence and the numbers of the irradiation. As a result, the particular advantage of the second embodiment is that the practical dynamic range of the line sensor 28 can be widened, and the reading rate by the line sensor is remarkably increased.

Arrangement of the Third Reading Apparatus

Figure 12:
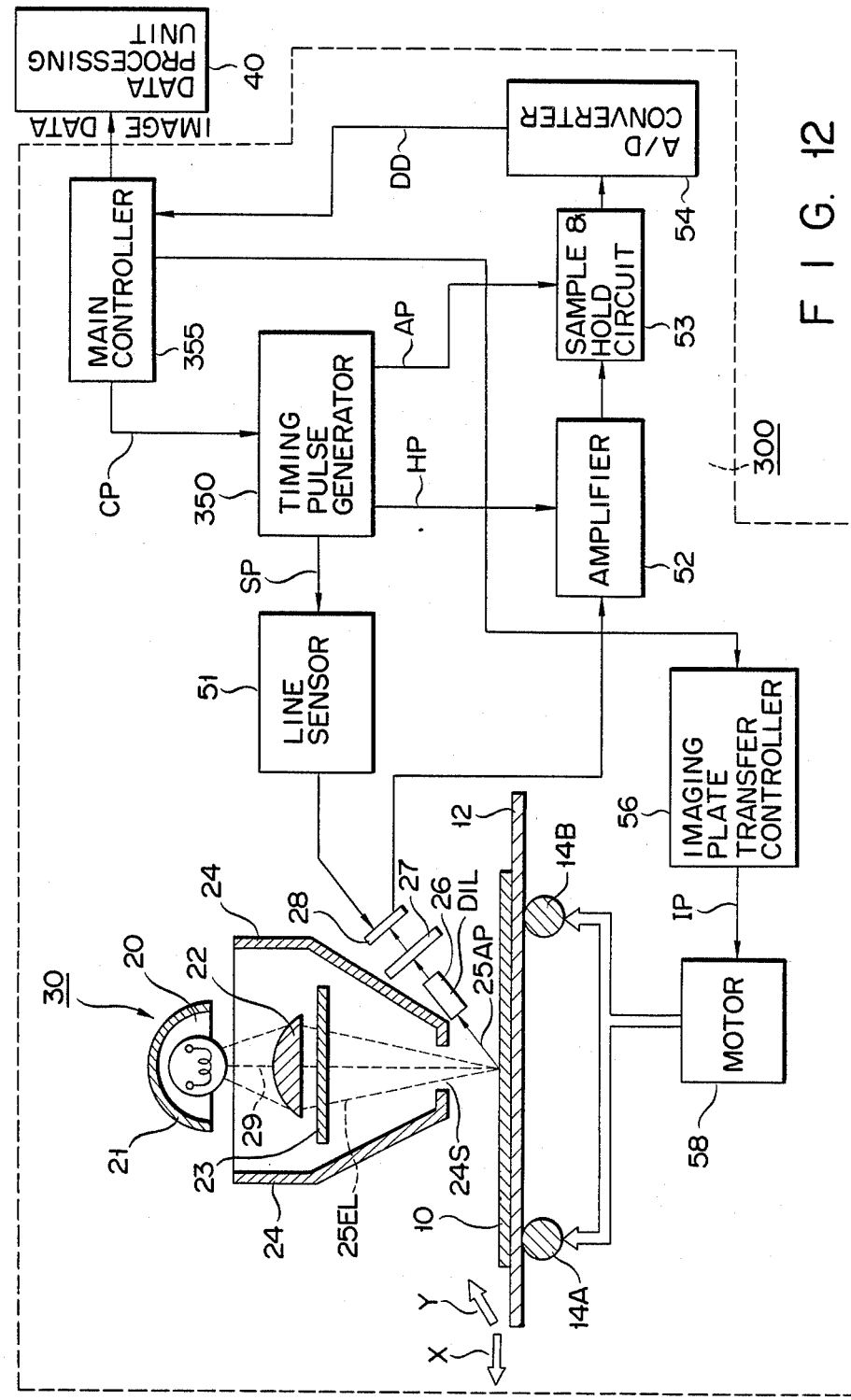
FIG. 12 is a schematic block diagram of a reading apparatus according to a third embodiment of the present invention.

FIG. 12 is a block diagram of a third reading apparatus 300 according to the invention. The same or similar circuit elements as those in FIG. 1 are indicated by the same reference numerals and the operations thereof are omitted.

In FIG. 12, the timing pulse SP derived from the timing pulse generator 350 is fed through the line sensor driver 51 to the line sensor 28. The line sensor 28 outputs the previously stored photo-carriers in responding to the timing pulse SP (see FIG. 4). The output signal charge is amplified in the amplifier 52. The amplified signal is processed in the sample and hold circuit 53. This circuit 53 samples and holds the output signal of the amplifier 52 in synchronism with the timing pulse HP. This output signal from the sample and hold circuit 53 is analog-to-digital converted in the A/D converter 54 in synchronism with the timing pulse AP. Thus the digital data DD of the A/D converter 54 is supplied to a main controller 355.

In the main controller 355, the digital data DD of the A/D converter 54 is corrected with respect to the light fluctuations of the halogen lamp 20, sensitivity differences in the pixels of the line sensor 28 and the storage time of the line sensor 28, and thereafter a histogram is formed from the data for one line storage area. Thus the distribution of light amounts of the accelerated phosphorescence incident upon the pixels is examined from this histogram. According to the third embodiment, although the inherent sensitivity of the line sensor 28 is constant, the practical sensitivity of the line sensor 28 can be changed by adjusting the frequency of an oscillator built in the timing pulse controller 350 under the control of the main controller 355.

That is, when the incident light amount of the line sensor 28 is small, the oscillation frequency is lowered to extend the storage time of the line sensor 28. As a result, this implies that the light amounts of the accelerated phosphorescence 25AP incident upon the line sensor 28 are increased in the succeeding line scanning. Similarly, when the incident light amounts are great, the oscillation frequency is increased so as to shorten the storage time of the line sensor 28, so that the same effect can be obtained as such a fact that the light amounts of the accelerated phosphorescence are reduced.

Such a sensitivity controlling is a very useful means to obtain image information for proper diagnosis when a distance between the adjacent lines is sufficiently small. That is, the adjoining lines store the continuous radiation image information, i.e., the correlation existing in the adjacent line signals.

Controlling the oscillation frequency of the built-in oscillator is well known in the field. For example, a capacitance of a capacitor, or a resistance value of a CR oscillator is changed, otherwise a division factor of a frequency divider is controlled.

As previously described, the main controller 355 corrects the digital data of the A/D converter 54, and thereafter transfers the corrected data to the data processing unit 40 and simultaneously forms the histogram. Then the main controller 355 produces the control signal CP based upon the histogram to control the oscillation frequency of the oscillator built in the timing pulse generator 350. The main controller 355, on the other hand, controls the motor 58 to transfer the imaging plate 10 in the column (X) direction.

Figure 13:
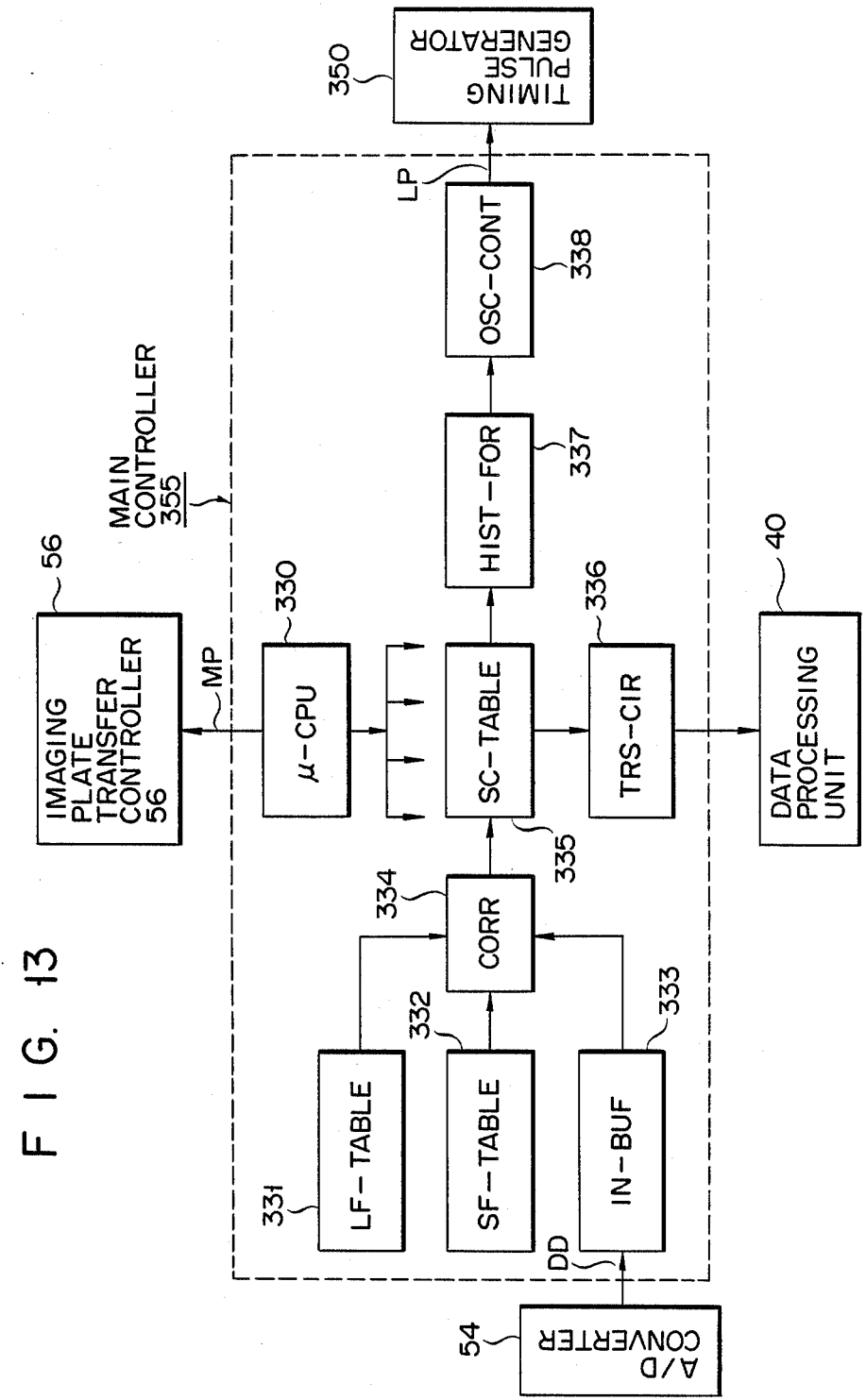
FIG. 13 shows a schematic circuit diagram of an internal circuit of the main controller shown in FIG. 12.

Referring to FIG. 13, a circuit diagram of the main controller 355 will now be described.

As initial conditions, the illumination fluctuations of the haloqen lamp 20 have been previously stored in a table for illumination fluctuations 331, because the intensities of the halogen lamp 20 at the peripheral portion are lower than those at the central portion. Furthermore, the sensitivity fluctuations of the respective pixels of the line sensor 28 have been stored in a table for sensitivity fluctuations 332. A central control processing unit 330 is provided to perform the entire system control.

After the irradiation and the scanning for a certain single line of the imaging plate 10 are completed, a given quantity of digital data for the line is delivered from the A/D converter 54 through an input buffer 333 to the main controller 355. As a result, the timing pulse MP is first fed to the imaging plate transfer controller 56 so that the imaging plate 10 is transferred by one pitch in the column (X) direction.

Every time the digital data DD is input from the A/D converter 54 to the main controller 355, the central processing unit (referred to as "CPU" hereinafter) 330 reads out values corresponding to the input pixel data from the illumination fluctuation table 331 for the halogen lamp 20 and the sensitivity fluctuation table 332 for the line sensor 28. The input pixel data is corrected in a correction circuit 334 based upon these values in the digital form. Thus the corrected data is stored as sensitivity correction data in a table for sensitivity correction 335.

When the sensitivity-corrected data for a given single line has been stored in the sensitivity correction table 335, the transfer circuit 336 adds to the above corrected data new data necessary for the data transmission, e.g., start bit, stop bit and parity bit and further amplifies it under the control of CPU 330 to transfer to the external data processing unit 40.

In the meantime, the sensitivity-corrected data stored in the table 335 is sent to a histogram forming circuit 337 so as to form a histogram. The CPU 330 compares this histogram with the standard histogram to measure deviation and further produces a control signal according to the deviation. A frequency control circuit 338 receives this control signal from the CPU 330 and sends a frequency control signal CP to the clock pulse oscillator 80 of the timing pulse generator 350 (see FIG. 5). Then the clock pulse frequency of the clock pulse oscillator 80 can be controlled. As a result, the light quantity of the accelerated phosphorescence incident upon the line sensor 28 is substantially controlled by extending or shortening the storage time of the line sensor 28. That is, the sensitivity of the line sensor 28 can be controlled.

It should be noted that:

(1) The histogram is directly formed without correcting the sensitivity of the input image data so as to change the sensitivity of the line sensor 28; and (2) The histograms are directly formed from the sensitivity-corrected data of the correction circuit 334 for the respective pixels of the single line.

According to the third embodiment, the sensitivity of the line sensor 28 for the succeeding line of the imaging plate 10 can be controlled based upon the histogram formed from the preceding line data so that the reception conditions of the line sensor 28 can be maintained at their optimum condition.

An evaluation will now be made of the halogen lamp 20 and the line sensor 28 employed in the reading apparatus 300 according to the invention.

Assuming that the width of the imaging plate 10 is 360 nm in the column direction, the lamp energy required for irradiating the imaging plate 10 with the line width of 100 $\mu$m is equal to 3.5 W.

The following relation is given between the lamp energy (W) and the luminous flux (1m):

$$1 \ (W) = 680 \times V \ (\lambda) \ [1m]$$

where $V \ (\lambda)$ is the relative luminous efficiency of the wavelength $(\lambda)$.

When the He-Ne laser is employed as the light source, its wavelength is 633 nm and the relative luminous efficiency V (λ=633) is approximately 0.4. As a result, the following relation is established:

$$1 \,(W) = 680 \times 0.4 = \text{approx. } 270 \,[lm]$$

Then the energy 3.6 (W) is equal to approximately 1,000 (1m).

As previously described, when the line-shaped halogen lamp 20 is employed as the light source 30 in the embodiments, the 5 KW (rating power) halogen lamp 20 is required if the luminous efficiency thereof is about 20 (1m/W) and the entire optical efficiency by use of the optical elements such as the bandpass filters is about 1/100. Such a 5 KW halogen lamp is commercially available.

Assuming that the converging efficiency of the distributed index lens assembly 26 is 0.05, the transmission factor of the second bandpass filter 27 is 0.7, the spectral sensitivity of the line sensor 28 for the accelerated phosphorescence having a wavelength of 400 nm is 0.4, and the storage time is 2 ms, the energy emitted from the imaging plate 10 excited by the laser having a beam spot of 100 $\mu m \phi$ is $10^{-8}$ (W). Accordingly, the energy E input in a unit area of the line sensor 28 is given by:

$$E = \frac{10^{-8} \times 10^6 \times 0.05 \times 0.7 \times 2 \times 10^{-3} \times 0.4}{0.005^2 \times \pi}$$
$$= 3.5 \times 10^{-3} \,[\mu J/cm^2].$$

Assuming that the sensitivity of the line sensor 28 is 2 (V/lx.sec), the saturation output voltage is 1 (V), the energy required for producing the saturation output voltage is 2.6 ($\mu J/cm^2$) which is obtained from the conversion formula between the amount of illumination and energy:

$$1 \,[lx] = 5.2 \times 10^{-6} \,[W/cm^2].$$

this case, the exposure of the saturation output voltage 1 (V) is 5.1 lx.sec. Accordingly, the resultant energy is approximately 750 times greater than the energy E input to the unit area of the line sensor 28.

In general, it is known that the transmission X-ray dose for the normal stomach examination is 1 mR (milliroentgen). Assuming that the output voltage at dark conditions of the line sensor 28 having the storage time of 2 ms is 1 mV, the dynamic range thereof is given by: saturation output voltage/output voltage at the dark condition =1,000. Consequently, the above-evaluated line sensor having the sensitivity of 2 (V/lx.sec) and the saturation voltage of 1 (V) can be sufficiently utilized in the reading apparatus according to the invention. Such a line sensor is commercially available.

The reading apparatus according to the invention can be constituted in compact and by employing inexpensive components. The particular advantage of the reading apparatus 300 is that the reading rate of the radiation image information is faster and the practical sensitivity of the line sensor can be substantially increased. For example, in the conventional reading apparatus, the time required for scanning one line of the imaging plate is approximately 20 ms, assuming that one line is constituted by 2,000 pixels and the irradiation time required for a single pixel is about 10 $\mu s$ by spot scanning light. In the reading apparatus according to the invention, the reading time is 10 times shorter than the conventional reading time when one line is scanned by the line shaped light having a length of 100 $\mu m$ (the scanning time is 2 ms).

What is claimed is:

1. An apparatus for reading a radiation image recorded on an image recording member comprising:
    white light source means operative to generate an exciting white light having a beam width dimension corresponding substantially to a width dimension of one entire line of a recording area of the image recording member for irradiating in succession, an entire line at a time, each individual line of a plurality of lines constituting said recording area, said white light source means including means operative to illuminate said plurality of lines with exciting white light having a substantially constant intensity of illumination;
    means for performing a relative displacement between said image recording member and said white light source, and for changing a position of said irradiated line of said image recording member with respect to said white light;
    collecting means responsive to the irradiation of each said individual line for collecting form each respective line accelerated phosphorescence emitted therefrom; and
    line sensor means responsive to each individual line of said collected accelerated phosphorescence for deriving, in time sequence, information relating to each said line of radiation in accordance with the recorded radiation image.

2. An apparatus as claimed in claim 1, wherein said light source means includes a line-shaped white light source and a cylindrical lens for linearly converging the white light.

3. An apparatus as claimed in claim 2, wherein said white light source is a line-shaped halogen lamp.

4. An apparatus as claimed in claim 1, further comprising:
    a first bandpass filter positioned between the light source means and the image recording member, for passing necessary exciting light and for blocking mainly the infrared and the accelerated phosphorescence contained in the line-shaped exciting light; and
    a second bandpass filter positioned between the image recording member and the line sensor means, for passing only the accelerated phosphorescence emitted from the image recording member.

5. An apparatus as claimed in claim 4, wherein the pass-band of said first bandpass filter is selected to be 450 to 750 nm, and the pass-band of said second bandpass filter is selected to be 350 to 450 nm.

6. An apparatus as claimed in claim 1, wherein the collecting means is a distributed index lens assembly having a plurality of distributed index lenses arranged in an array.

7. An apparatus as claimed in claim 1, wherein said line sensor means includes:
    a photoelectric conversion stage for photoelectrically converting the incident accelerated phosphorescence into photo-carriers;
    a charge storage stage for storing the photo-carriers therein; and
    a transfer stage for reading the photo-carriers from the charge storage stage and for time-sequentially delivering the read photo-carriers to an outputs stage, as a radiation image signal.

8. An apparatus for reading a radiation image recorded on an image recording member comprising:
light source means operative to generate an exciting light having a beam width dimension corresponding substantially to a width dimension of one entire line of a recording area of the image recording member;
means for repeatedly irradiating with said exciting light each line of said plurality of lines of said image recording areas;
means for controlling the light source means for changing an intensity of the exciting light for each repetitive irradiation of each of said plurality of lines;
means for performing a relative displacement between said image recording member and said light source and for changing a position of said irradiated line of said image recording member with respect to said light after plural irradiations of the same line;
collecting means responsive to the irradiation of each said individual line for collecting from each respective lines accelerated phosphorescence emitted therefrom; and
line sensor means responsive to the collected accelerated phosphorescence of each changed intensity of an individual line for deriving, in time sequence, information having a range corresponding to the difference intensities of each said line of radiation in accordance with the recorded radiation image.

9. An apparatus as claimed in claim 8, wherein said control means includes a variable resistor connected to said light source means, and a pulse motor connected to a slider of the variable resistor.

10. An apparatus as claimed in claim 8, wherein said light source means includes a line-shaped white light source and a cylindrical lens for linearly converging the white light.

11. An apparatus as claimed in claim 10, wherein said white light source is a line-shaped halogen lamp.

12. An apparatus as claimed in claim 8 further comprising:
a first bandpass filter positioned between the light source means and the image recording member, for passing necessary exciting light and for blocking mainly the infrared and the accelerated phosphorescence contained in the line-shaped exciting light; and
a second bandpass filter positioned between the image recording member and the line sensor means, for passing only the accelerated phosphorescence emitted from the image recording member.

13. An apparatus as claimed in claim 12, wherein the pass-band of said first bandpass filter is selected to be 450 to 750 nm, and the pass-band of said second bandpass filter is selected to be 350 to 450 nm.

14. An apparatus as claimed in claim 8, wherein the collecting means is a distributed index lens assembly having a plurality of distributed index lenses arranged in an array.

15. An apparatus as claimed in claim 8, wherein said line sensor means includes:
a photoelectric conversion stage for photoelectrically converting the incident accelerated phosphorescence into photo-carriers;
a charge storage stage for storing the photo-carriers therein; and
a transfer stage for reading the photo-carriers from the charge storage stage and for time-sequentially delivering the read photo-carriers to an outputs stage, as a radiation image signal.

16. An apparatus for reading a radiation image recorded on an image recording member comprising:
light source means operative to generate an exciting light having a beam width dimension corresponding substantially to a width dimension of one entire line of a recording area of the image recording member for irradiating in succession each individual line of a plurality of lines constituting said recording area;
means for performing a relative displacement between said image recording member and said light source and for changing a position of said irradiating line of said image recording member with respect to said light;
collecting means responsive to the irradiation of each said individual line for collecting from each respective line accelerated phosphorescence emitted therefrom and
line sensor means, having a variable sensitivity, responsive to the collected accelerated phosphorescence of each changed intensity of an individual line for deriving, in time sequence, information having a range corresponding to the difference intensities of each said line of radiation in accordance with the recorded radiation image; and
main control means coupled to the line sensor means, including means for producing a function control signal having a value corresponding to the intensity of the radiation image information derived from the line sensor means, including means for varying the sensitivity of the line sensor means in response to the value of said function control signal.

17. An apparatus as claimed in claim 16, wherein said line sensor means includes:
a photoelectric conversion stage for photoelectrically converting the incident accelerated phosphorescence into photo-carriers;
a charge storage stage for storing the photo-carriers therein; and
a transfer stage for reading the photo-carriers for the charge storage stage and for time-sequentially delivering the read photo-carriers to an outputs stage, as a radiation image signal.

18. An apparatus as claimed in claim 17, wherein said main control means includes:
a histogram forming circuit for forming a histogram based upon the radiation image signal; and
an oscillation frequency control circuit coupled to the histogram forming circuit, for controlling an oscillation frequency of clock pulses to change a storage time of the charge storage stage.

19. An apparatus as claimed in claim 16, wherein said light source means includes a line-shaped white light source and a cylindrical lens for linearly converging the white light.

20. An apparatus as claimed in claim 19, wherein said white light source is a line-shaped halogen lamp.

21. An apparatus as claimed in claim 16 further comprising:
a first bandpass filter positioned between the light source means and the image recording member, for passing necessary exciting light and for blocking mainly the infrared and the accelerated phosphorescence contained in the line-shaped exciting light; and a second bandpass filter positioned between the image recording member and the line sensor means, for passing only the accelerated phosphorescence emitted from the image recording member.

22. An apparatus as claimed in claim 21, wherein the pass-band of said first bandpass filter is selected to be 450 to 750 nm, and the pass-band of said second bandpass filter is selected to be 350 to 450 nm.

23. An apparatus as claimed in claim 16, wherein the collectinq means is a distributed index lens assembly having a plurality of distributed index lenses arranged in an array.

24. An apparatus as claimed in claim 18 further comprising a correction circuit for correcting the sensitivity of the radiation image signal based upon illuminance fluctuations of the light source means and sensitivity fluctuations of the line sensor means.

25. An apparatus according to claim 8, wherein the means for controlling the light source means changes the intensity of the light from a first repetitive irradiation through a final repetitive irradiation of each line sufficient to effect a dynamic range from one to one hundred between the first and final intensities of the exciting light.

* * * * *